July 11, 1933.  E. G. PURDY  1,917,460
MOTOR VEHICLE
Filed April 7, 1931
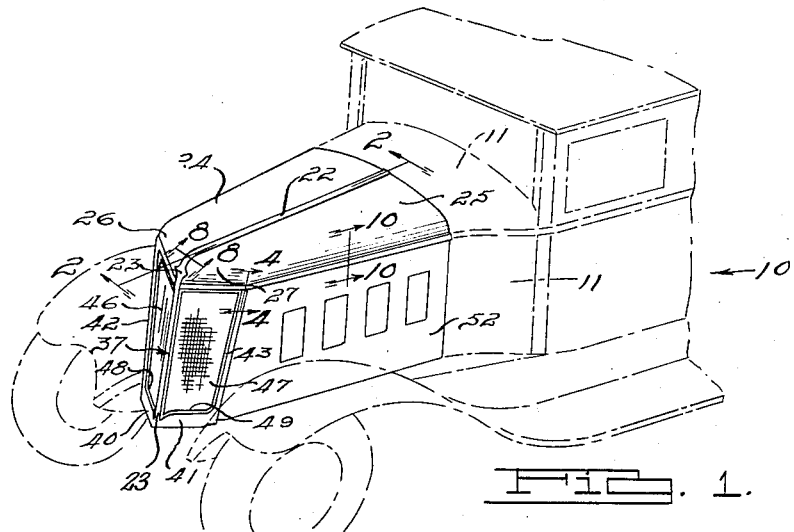
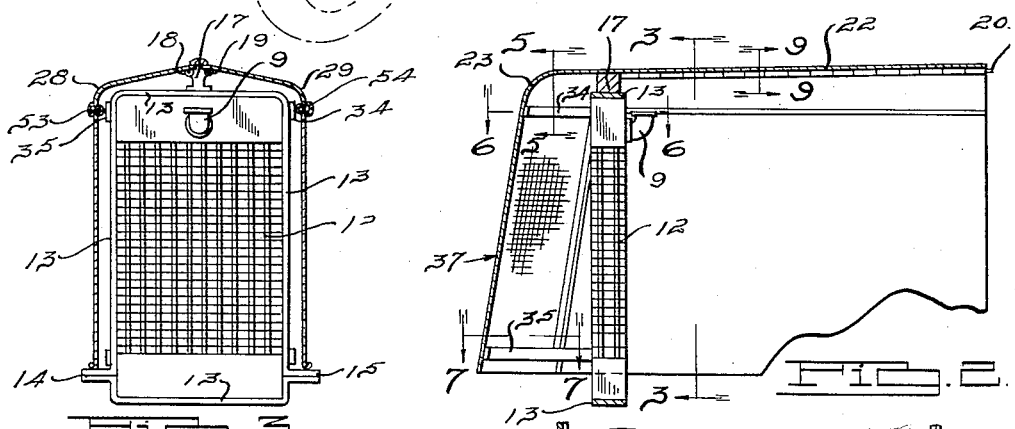
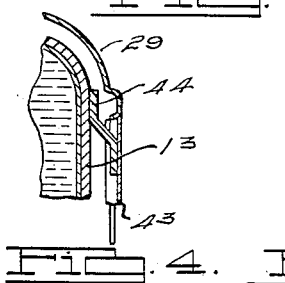
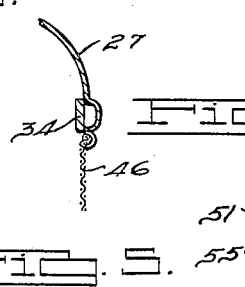
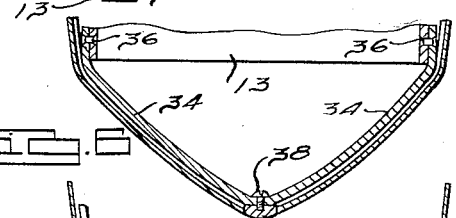
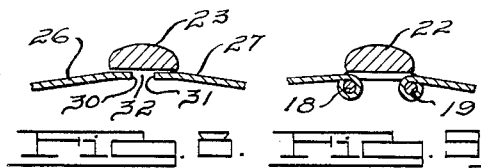
INVENTOR
Emmett G. Purdy.
BY Harness, Dickey,
Pierce & Hann,
ATTORNEYS.

Patented July 11, 1933

1,917,460

UNITED STATES PATENT OFFICE

EMMETT G. PURDY, OF DETROIT, MICHIGAN, ASSIGNOR TO DETROIT BODY DIE COMPANY, A CORPORATION OF MICHIGAN

MOTOR VEHICLE

Application filed April 7, 1931. Serial No. 528,337.

This invention relates to a motor vehicle and it has particular relation to a hood for the vehicle.

The main objects of the invention are to provide a hood which will obviate the radiator shell heretofore employed on motor vehicles; to provide a hood for the motor which also constitutes a housing for the radiator; to provide a hood which may be easily assembled or disassembled with respect to the vehicle; and to provide a hood which enhances the streamline appearance of the vehicle.

Ordinarily in the construction of motor vehicles, a radiator, having a shell, is mounted at the front end of the vehicle. Also a hood is mounted between the radiator and the cowl portion of the vehicle and is supported at one end by the cowl and at the other end by the radiator shell. In a construction of this type both end portions of the hood are parallel to each other, and the front end thereof contacts with the rear marginal edge of the radiator shell.

Briefly, according to one form of the invention, a hood frame is provided, having a pair of hinged top panels, supported at their rear ends by the cowl panel and extending beyond the front portion of the radiator core. Each of the top panels has its front end curved downwardly in front of the radiator until its front edge is substantially aligned horizontally with the side edges of the panels. These curved front ends are so shaped that they form a forwardly pointed V-shape front, as seen from a point above the hood. A V-shape front panel is rigidly secured to the radiator frame with the upper edge thereof contacting with the edges of the forwardly extending and downwardly bent portions of the top panels. Side panels, each of which is hinged to a top panel, have their front side edges contacting with the rearwardly projecting portions of the front panel. A hood of this character substantially encloses the radiator of the vehicle and enhances the general appearance of the latter considerably.

For a better understanding of the invention reference may now be had to the accompanying drawing, forming a part of this specification, in which—

Figure 1 is a fragmentary perspective view of a motor vehicle, having a hood constructed according to one form of the invention.

Figure 2 is a cross sectional view, taken substantially along line 2—2 of Figure 1.

Figure 3 is a cross sectional view, taken substantially along line 3—3 of Figure 2.

Figure 4 is an enlarged, fragmentary cross sectional view taken substantially along line 4—4 of Figure 1.

Figure 5 is an enlarged fragmentary cross sectional view, taken substantially along line 5—5 of Figure 2.

Figure 6 is an enlarged cross sectional view, taken substantially along line 6—6 of Figure 2.

Figure 7 is an enlarged cross sectional view, taken substantially along line 7—7 of Figure 2.

Figure 8 is an enlarged cross sectional view, taken substantially along line 8—8 of Figure 1.

Figure 9 is an enlarged cross sectional view, taken substantially along line 9—9 of Figure 2.

Figure 10 is an enlarged cross sectional view, taken substantially along line 10—10 of Figure 1.

In practicing my invention a motor vehicle 10 is provided having a cowl portion 11, and a vertically disposed radiator 12 mounted thereon. The latter is provided with a filler opening 9 which in this instance is located along the front side of the radiator. A radiator frame 13 supports the radiator 12 and is rigidly secured to the chassis of the vehicle, by means of bolts (not shown) co-acting with horizontally disposed flanges 14 and 15 extending from each side of the frame 13. A bracket 17 centrally disposed on the top of the frame 13, supports one end of hood hinging elements 18 and 19, while the other ends of the latter are adapted to be supported by the cowl 11 as indicated at 20. Integral with the hinge elements 18 and 19 is a bead portion 22 which extends forwardly from the cowl 11 over the bracket 17 and is provided in advance of said bracket with a downwardly bent portion 23. The hinge elements 18 and 19 movably support a pair of top hood panels 24 and 25 having forwardly extending downwardly bent portions 26 and 27 adjacent the front end thereof, terminating in lower edges disposed in the same horizontal plane as side edges of downwardly bent side portions 28 and 29 of the panels. The curved front ends of the top panels are so shaped that they form a forwardly pointed V-shaped front, when viewed in plan. The hinge elements 18 and 19 extend only from the cowl 11, upon which rests the rear marginal edges of the hood when the hood is closed, to the bracket 17, supported by the frame 13. As best shown in Figure 8, the downwardly bent portions 26 and 27 of the top panels 24 and 25 are not secured together, but are so shaped that they pass under the downwardly bent portion 23 of the bead 22 with adjacent edges 30 and 31 thereof in substantially abutting relation as indicated at 32.

A pair of forwardly extending V-shape brackets 34 and 35, rigidly secured to the radiator frame 13, by means of rivets 36, rigidly supports a frame 37 including the head portion 23, of the bead 22 extending downwardly in front of the radiator. This frame includes a pair of rearwardly diverging horizontal frame members 40 and 41 that extend from the lower end of the bead portion 23 and are connected at their rear ends to a pair of substantially vertical members 42 and 43, rigidly supported by brackets 44, connected to the sides of the radiator frame 13. Any suitable means such as the screws 38 may be used to secure the bead portion 23 to the frames 34 and 35.

A pair of front panels 46 and 47 rigidly mounted in the frame 37, by means of beads 48 and 49 on the frame members, is provided, top edges thereof abutting the lower edges of the forwardly extending and downwardly bent portions 26 and 27 of the top panels. A pair of side panels 51 and 52 are movably secured to the lower side edges of the top panels 24 and 25 by means of hinge elements 53 and 54 with their forward edges overlapping the frame members 42 and 43 respectively as indicated at 55 and 56.

From the foregoing description, it is apparent that a hood for motor vehicles is provided, which obviates the radiator shell heretofore employed. Moreover it will be noticed that with the side panels of the hood converging slightly towards the front of the motor vehicle and terminating in abruptly diverging front panels, a hood is provided which enhances the streamline appearance of the vehicle.

Additionally the radiator filler opening is not visible, thereby desirably enhancing the appearance of the vehicle, while at the same time avoiding the use of special constructions of radiator shells through which the filler spout ordinarily projects.

Although I have illustrated but one form which the invention may assume and have described in detail but a single application thereof, it will be apparent to those skilled in the art that it is not so limited but that various modifications and changes may be made therein without departing from the spirit of the invention or from the scope of the appended claims.

I claim:

1. A hood for motor vehicles, comprising a pair of top panels, means for movably securing the panels together, a frame integral with the aforesaid means, a pair of front panels rigidly secured to the frame, a portion of each front panel abutting the forward edge of the respective top panel and a pair of side panels movably secured to the top panels, a portion of each side panel abutting a portion of the frame.

2. A hood for motor vehicles, comprising a pair of top panels, each having a forwardly extending downwardly bent portion thereon, means for movably securing the top panels together, a frame integral with the aforesaid means, a pair of front panels rigidly mounted in the frame, a portion of each front panel co-acting in abutting relation with a downwardly bent portion of the top panels, and a pair of side panels movably secured to the top panel, each of the side panels abutting a portion of the frame member.

3. The combination with a motor vehicle, having a cowl and a radiator, of a hood comprising a pair of top panels, each having a downwardly bent portion thereon, means for movably securing the panels together, a frame integral with the aforesaid means, having rearwardly diverging portions, a pair of front panels rigidly mounted in the frame, each of the front panels co-acting in abutting relation with the downwardly bent portion of a top panel, and a pair of side panels movably secured to the top panels, each side panel contacting with a portion of the frame.

4. The combination with a motor vehicle, having a cowl and a radiator, of a hood comprising a pair of top panels, each having a downwardly bent portion thereon, the bent portion extending forwardly from the front of the radiator, means extending from the cowl to the radiator frame for hinging the top panels together, a frame having diverging portions which is integral with the aforesaid means, means for rigidly securing said frame to the radiator frame, a pair of front panels rigidly mounted in the frame, the front panels co-acting in abutting relation with the top panels respectively, and a pair of side panels movably mounted on the top panels, each side panel abutting a portion of the frame.

5. The combination with a motor vehicle having a cowl and a radiator, of a hood comprising a pair of top panels, each having a forwardly extending downwardly bent portion substantially forming a front, and a laterally extending, downwardly bent side portion, the front end of the top panels being curved downwardly to the horizontal plane of the edges of the laterally downwardly bent portions of the top panels, a bracket centrally disposed on the radiator, hinge elements extending from the cowl to said bracket for movably supporting the top panels, a frame having rearwardly diverging portions integral with the hinge elements, means for rigidly securing said frame to the radiator, a pair of front panels rigidly mounted in the frame, each panel co-acting in abutting relation with one of the top panels, and a pair of side panels movably connected to the laterally extending downwardly bent portions of the top panels, each side panel abutting a portion of the frame.

6. A hood for motor vehicles, comprising rearwardly diverging front panels, top panels extending rearwardly from the upper edges of said rearwardly diverging front panels and having their adjacent longitudinal edges connected together in line with the joint between the front panels, and side panels hingedly connected to the outer longitudinal edges of said top panels and having their upright forward edges in rear and substantially abutting the upright rear edges of said diverging panels.

7. The combination with a motor vehicle, having a cowl and a radiator, of a hood comprising top panels having adjacent longitudinal edges connected together and provided at their forward ends in advance of the radiator with forwardly converging downwardly extending portions, forwardly converging front panels in vertical alignment with and substantially abutting said downwardly extending portions, and a pair of side panels secured to the top panels along their remote longitudinal edges in rear and having upright portions substantially abutting the rear upright edges of said front panels.

8. The combination with a motor vehicle, having a cowl and a radiator, of a hood for the radiator comprising a pair of top panels secured to the cowl and having forwardly converging downwardly bent portions in advance of the radiator, means for movably securing the top panels together, a pair of rearwardly diverging front panels beneath and substantially in vertical alignment with said bent portions, and a pair of side panels movably secured to the top panels and forming rearward extensions of said front panels.

9. An enclosure for a radiator and motor of an automobile comprising a pair of rearwardly diverging front panels, and a hood having top panels above and side panels in rear of said front panels, the joint between the top panels being in line with and extending to the joint between the front panels, the forward ends of said top panels diverging rearwardly from the joint between said front panels, substantially in vertical alignment with and substantially abutting the upper edges of said diverging front panels, the joint between the top and side panels being in rear of and substantially in horizontal alignment with the upper edges of said front panels, and the forward upright edges of the side panels being in rear and substantially abutting the upright rear edges of said diverging front panels.

10. In a motor vehicle, the combination with a chassis frame, of an upright radiator frame extending transversely of said chassis frame, a bracket centrally located on top of the radiator frame, a motor hood having hingedly connected top sections above and projecting rearwardly from the radiator frame and having side sections hingedly connected to the top sections and projecting rearwardly from said radiator frame, the joint between the top sections being in substantially vertical alignment with and supported on said bracket, the joints between the top and side sections being at opposite sides and adjacent the top of said radiator frame, a bead extending longitudinally of the joint between the top sections and over the bracket to a point in advance of said radiator frame, thence downwardly in front of the radiator frame to a point substantially in horizontal alignment with the bottom of said frame, the top sections being provided in advance of the radiator frame with extensions that project to the downwardly extending portion of the bead and form a V in plan, the outer edge portions of said extensions curving downwardly to points substantially in horizontal alignment with the joints between the top and side sections, upright frame members beneath and substantially in vertical alignment with the rear ends of the top section extensions, substantially horizontal frame members diverging rearwardly from the downwardly extending portion of said bead to said upright frame members and cooperating with said upright frame members and downwardly extending portion of said bead to form rearwardly diverging frames beneath and substantially in vertical alignment with the downwardly curved portions of said top section extensions, and panels secured in said frames and cooperating with the downwardly curved portions of said top sections to form a substantially V-shaped front for said hood.

EMMETT G. PURDY.